US012732234B2

(12) United States Patent
Chi et al.

(10) Patent No.: US 12,732,234 B2
(45) Date of Patent: Sep. 8, 2026

(54) PRECODING METHOD AND APPARATUS, USER EQUIPMENT, RIS ARRAY, BASE STATION AND STORAGE MEDIUM

(71) Applicant: BEIJING XIAOMI MOBILE SOFTWARE CO., LTD., Beijing (CN)

(72) Inventors: Liangang Chi, Beijing (CN); Li Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 211 days.

(21) Appl. No.: 18/713,698

(22) PCT Filed: Nov. 29, 2021

(86) PCT No.: PCT/CN2021/134161
§ 371 (c)(1),
(2) Date: May 27, 2024

(87) PCT Pub. No.: WO2023/092602
PCT Pub. Date: Jun. 1, 2023

(65) Prior Publication Data
US 2025/0038792 A1 Jan. 30, 2025

(51) Int. Cl.
*H04B 7/04* (2017.01)
*G01S 3/46* (2006.01)

(52) U.S. Cl.
CPC ............ *H04B 7/04026* (2023.05); *G01S 3/46* (2013.01)

(58) Field of Classification Search
CPC ............ H04B 7/04026; H04B 7/04013; H04B 7/0626; H04B 7/0617; G01S 3/46
See application file for complete search history.

(56) References Cited

U.S. PATENT DOCUMENTS 11,777,206 B2 * 10/2023 Zhu ...................... H04B 7/0617 375/267
2015/0381254 A1 12/2015 Liang
(Continued)

FOREIGN PATENT DOCUMENTS

CN 111245494 A 6/2020
CN 112887002 A 6/2021
(Continued)

OTHER PUBLICATIONS

International Search Report issued in Application No. PCT/CN2021/134161, dated May 9, 2022, with English Translation, (6p).
(Continued)

*Primary Examiner* — Timothy A Brainard
*Assistant Examiner* — Kenneth W Good
(74) *Attorney, Agent, or Firm* — Arch & Lake LLP

(57) ABSTRACT

A precoding method is performed by a reconfigurable intelligent surface (RIS) array. The method includes: determining incident angle information, the incident angle information including incident angle information of an incident beam transmitted by a base station to the RIS array; acquiring a precoding matrix index (PMI), the PMI being determined according to channel information between the RIS array and a user equipment (UE); determining reflection angle information corresponding to the RIS array according the PMI; and determining a target deflection phase angle of each RIS array element in the RIS array according to the incident angle information and the reflection angle information, to precode the RIS array.

12 Claims, 10 Drawing Sheets

(56) References Cited

U.S. PATENT DOCUMENTS

| | | | | |
|---|---|---|---|---|
| 2022/0416968 A1* | 12/2022 | Nam | H04W 72/54 | |
| 2023/0129288 A1* | 4/2023 | Sun | H04B 7/04026 | 375/267 |
| 2023/0318177 A1* | 10/2023 | Zhou | H04L 25/0204 | 455/456.1 |
| 2024/0072849 A1* | 2/2024 | Haija | H04B 7/0695 | |
| 2024/0137134 A1* | 4/2024 | Sahraei | H04B 17/103 | |
| 2024/0235635 A1* | 7/2024 | Zhinong | H01Q 15/0086 | |
| 2024/0305335 A1* | 9/2024 | Elshafie | H01Q 15/0013 | |

FOREIGN PATENT DOCUMENTS

| | | |
|---|---|---|
| CN | 113078932 A | 7/2021 |
| CN | 113193894 A | 7/2021 |
| CN | 113300747 A | 8/2021 |
| CN | 113645171 A | 11/2021 |

OTHER PUBLICATIONS

The extended European search report issued in Application No. 21965331.8 dated Sep. 17, 2025, (16p).

Ertugrul Basar et al., "Indoor and Outdoor Physical Channel Modeling and Efficient Positioning for Reconfigurable Intelligent Surfaces in mmWave Bands", IEEE Transactions on Communications, vol. 69, No. 12, Dec. 2021, (12p).

Li You et al., "Energy Efficiency and Spectral Efficiency Tradeoff in RIS-Aided Multiuser MIMO Uplink Transmission", arXiv: 2011.09724v1 [cs.IT], Nov. 19, 2020, (14p).

* cited by examiner

PRECODING METHOD AND APPARATUS, USER EQUIPMENT, RIS ARRAY, BASE STATION AND STORAGE MEDIUM

CROSS-REFERENCE TO RELATED APPLICATION

This application is a U.S. national phase of International Application No. PCT/CN2021/134161, filed on Nov. 29, 2021, the entire disclosure of which is incorporated herein by reference for all purposes.

TECHNICAL FIELD

The disclosure relates to the field of communication technologies, and particularly to a precoding method, a user equipment (UE), a reconfigurable intelligent surface (RIS) array, a base station, and a non-transitory storage medium.

BACKGROUND

In communication systems, the introduction of reconfigurable intelligent surface (RIS) precoding technologies enables an incident signal transmitting from a base station to an RIS to be reflected or refracted to a user equipment (UE) in a desired direction, thereby constructing an intelligently programmable wireless environment. This strengthens the received signal strength at the UE and achieves control over channels.

In the related art, a joint precoding design at the RIS and the base station heavily relies on alternate optimization technologies, but such manners tend to be overly complex and less applicable in practice.

SUMMARY

According to an aspect of the disclosure, a precoding method is provided and is performed by an RIS array. The method includes: determining incident angle information, the incident angle information including incident angle information of an incident beam transmitted by a base station to the RIS array; acquiring a precoding matrix index (PMI), the PMI being determined according to channel information between the RIS array and a UE; determining reflection angle information corresponding to the RIS array according to the PMI; and determining a target deflection phase angle of each RIS array element in the RIS array according to the incident angle information and the reflection angle information, to precode the RIS array.

According to another aspect of the disclosure, a precoding method is provided and is performed by a base station. The method includes: acquiring a PMI from a UE; and forwarding the PMI to an RIS array.

According to still another aspect of the disclosure, a precoding method is provided and is performed by a UE. The method includes: determining a PMI according to channel information between an RIS array and the UE; and transmitting the PMI to a base station and/or the RIS array.

BRIEF DESCRIPTION OF THE DRAWINGS

The above and/or additional aspects and advantages of the disclosure will become obvious and easy to understand from the following descriptions according to the embodiments in conjunction with the accompanying drawings.

FIG. 6 is a flowchart illustrating a precoding method according to yet still other embodiments of the disclosure.

FIG. 7 is a flowchart illustrating a precoding method according to yet still other embodiments of the disclosure.

DETAILED DESCRIPTION

Figure 1:
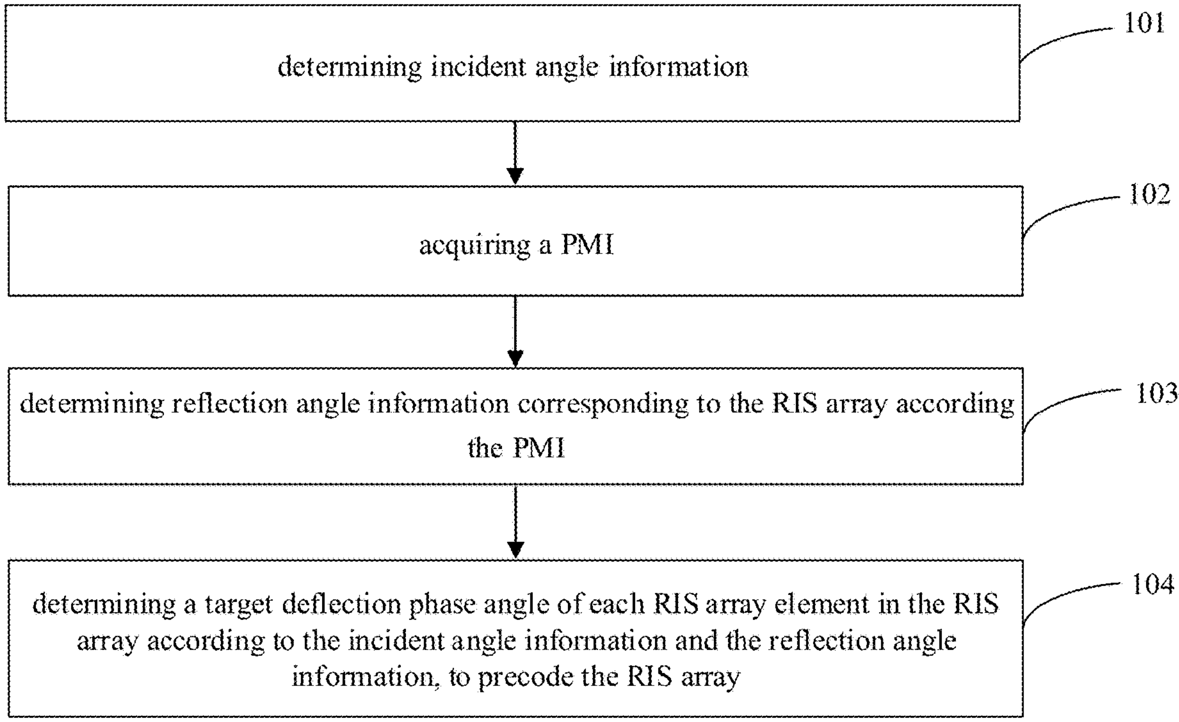
FIG. 1 is a flowchart illustrating a precoding method according to some embodiments of the disclosure.

Reference will now be made in detail to some embodiments, examples of which are illustrated in the accompanying drawings. The following descriptions refer to the accompanying drawings in which the same numbers in different drawings represent the same or similar elements unless otherwise represented. The implementations set forth in the following descriptions according to some embodiments do not represent all implementations consistent with the disclosure. Instead, they are merely examples of apparatuses and methods consistent with aspects related to the disclosure as recited in the appended claims.

Terms used according to embodiments of the disclosure are merely for describing specific examples and are not intended to limit embodiments of the disclosure. The singular forms “a,” “the,” and the like used in the disclosure and the appended claims are also intended to include a multiple form, unless other meanings are clearly represented in the context. It should also be understood that the term “and/of” used in the disclosure refers to any or all of possible combinations including one or more associated listed items.

It should be understood that although terms “first,” “second,” “third,” and the like are used according to embodiments of the disclosure to describe various information, the information is not limited to the terms. These terms are merely used to differentiate information of a same type. For example, without departing from the scope according to embodiments of the disclosure, first information is also referred to as second information, and similarly the second information is also referred to as the first information. Depending on the context, for example, the term “if,” “in case of,” and the like used herein may be explained as “when” or “while,” or “in response to . . . , it is determined that.”

Embodiments of the disclosure are described in detail below, examples of which are illustrated in the accompanying drawings, where like or similar reference numerals designate like or similar elements throughout. The embodiments described below by referring to the accompanying drawings are exemplary, are intended to explain the disclosure, and should not be construed as limiting the disclosure.

A precoding method, a precoding apparatus, a user equipment (UE), a reconfigurable intelligent surface (RIS) array, a base station, and a non-transitory storage medium according to the disclosure will be described in detail below with reference to the accompanying drawings.

FIG. 1 is a flowchart illustrating a precoding method according to some embodiments of the disclosure. The method is applicable to an RIS array. As illustrated in FIG. 1, the precoding method may include the following steps.

Step 101, incident angle information is determined.

According to embodiments of the disclosure, the incident angle information may include incident angle information of an incident beam transmitted by the base station to the RIS array.

According to embodiments of the disclosure, the manner for determining the incident angle information may include the following steps:

Step a, a horizontal-dimension incident angle and a vertical-dimension incident angle of the incident beam transmitted by the base station, are acquired, and/or a sum of the horizontal-dimension incident angle and the vertical-dimension incident angle of the incident beam transmitted by the base station, is acquired.

According to embodiments of the disclosure, the horizontal-dimension incident angle includes an angle between the incident beam and an antenna array surface of the RIS array in a horizontal dimension, and the vertical-dimension incident angle includes an angle between the incident beam and the antenna array surface of the RIS array in a vertical dimension.

According to some embodiments of the disclosure, the base station may transmit only the horizontal-dimension incident angle and the vertical-dimension incident angle of the incident beam to the RIS array. According to other embodiments of the disclosure, the base station may transmit directly the sum of the horizontal-dimensional incident angle and the vertical-dimensional incident angle of the incident beam to the RIS array. In yet other embodiments of the disclosure, the base station may transmit the horizontal-dimensional incident angle and the vertical-dimensional incident angle of the incident beam, and the sum of the horizontal-dimensional incident angle and the vertical-dimensional incident angle, to the RIS array.

Step b, the sum of the horizontal-dimension incident angle and the vertical-dimension incident angle is determined as the incident angle information.

Step 102, a precoding matrix index (PMI) is acquired.

According to embodiments of the disclosure, the PMI may be determined by a UE according to channel information between the RIS array and the UE. In detail, according to embodiments of the disclosure, the UE may determine the most suitable precoding matrix for the channel according to the channel information between the RIS array and the UE, and transmit the PMI corresponding to the precoding matrix to the RIS array. When the RIS array reflects the incident beam transmitted by the base station to the UE subsequently, it may perform adaptive precoding on the RIS array according to the PMI, ensuring the communication quality.

According to embodiments of the disclosure, the UE may be a device that provides voice and/or data connectivity to a user. The terminal device may communicate with one or more core networks via a radio access network (RAN). The UE may be an internet of things (IoT) terminal such as a sensor device, a mobile phone (or referred to as a cellular phone), and a computer having an IoT terminal such as a fixed, portable, compact, handheld, computer built-in, or vehicle-mounted apparatus. For example, a station (STA), a subscriber unit, a subscriber station, a mobile station, a mobile, a remote station, an access point, a remote terminal, an access terminal, a user terminal, or a user agent. Alternatively, the UE may be a device of an unmanned aerial vehicle (UAV). Alternatively, the UE may be a vehicle-mounted device, for example, a vehicle computer with a wireless communication function, or a wireless terminal externally connected to a vehicle computer. Alternatively, the UE may be a roadside device, for example, a street lamp, a signal lamp, or other roadside device with a wireless communication function.

According to embodiments of the disclosure, the manner for the UE to transmit the PMI to the RIS array may include at least one of the following:

The UE transmits the PMI directly to the RIS array; or

The UE transmits the PMI to the base station, and the base station forwards the PMI to the RIS array.

Step 103, reflection angle information corresponding to the RIS array is determined according the PMI.

According to embodiments of the disclosure, the manner for determining the reflection angle information corresponding to the RIS array according to the PMI may include the following steps:

Step 1, a precoding matrix corresponding to the PMI is determined.

Step 2, a horizontal-dimension precoding vector and a vertical-dimension precoding vector corresponding to the precoding matrix are determined.

Step 3, a horizontal-dimension reflection angle and a vertical-dimension reflection angle corresponding to the RIS array are determined according to the horizontal-dimension precoding vector and the vertical-dimension precoding vector.

According to embodiments of the disclosure, the horizontal-dimension reflection angle may include an angle between a reflection beam corresponding to the RIS array and the antenna array surface of the RIS array in the horizontal dimension, and the vertical-dimension reflection angle may include an angle between the reflection beam corresponding to the RIS array and the antenna arrays surface of the RIS array in the vertical dimension.

According to embodiments of the disclosure, the relevant introduction of determining the horizontal-dimensional reflection angle and the vertical-dimensional reflection angle according to the horizontal-dimensional precoding vector and the vertical-dimensional precoding vector may refer to the descriptions of the prior art, and this disclosure does not discuss herein repeatly.

Step 4, a sum of the horizontal-dimension reflection angle and the vertical-dimension reflection angle is determined as the reflection angle information.

Step 104, a target deflection phase angle of each RIS array element in the RIS array is determined according to the incident angle information and the reflection angle information, to precode the RIS array.

The detailed introduction of determining the target deflection phase angle of each RIS array element according to the incident angle information and the reflection angle information may refer to the descriptions of the subsequent embodiments.

According to embodiments of the disclosure, after determining the target deflection phase angle of each RIS array element, when using the RIS array to reflect the incident beam transmitted by the base station, to the UE, the deflection angle of each RIS array element may be adjusted to the target deflection phase angle, and then the adjusted RIS array elements are used to reflect the incident beam to the UE. Since the target deflection phase angle is determined according to the reflection angle information, the reflection angle information is determined according to the PMI, and the PMI is determined according to the channel information between the RIS array and the UE. Therefore, when the determined target deflection angle of each RIS array element is used to reflect the incident beam, the reflected beam acquired may be a beam most suitable for the channel between the RIS array and the UE, thereby ensuring the communication quality.

In conclusion, in the precoding method according to embodiments of the disclosure, the RIS array may determine the incident angle information of the incident beam, acquire the PMI where the PMI is determined according to the channel information between the RIS array and the UE, determine the reflection angle information corresponding to the RIS array according to the PMI, and determine the target deflection phase angle of each RIS array element in the RIS array according to the incident angle information and the reflection angle information, to precode the RIS array. It may be seen that according to embodiments of the disclosure, the RIS array may determine the reflection angle information according to the PMI and precode the RIS array according to the incident angle information and reflection angle information, such that the complexity is lower and the applicability is higher.

Figure 2:
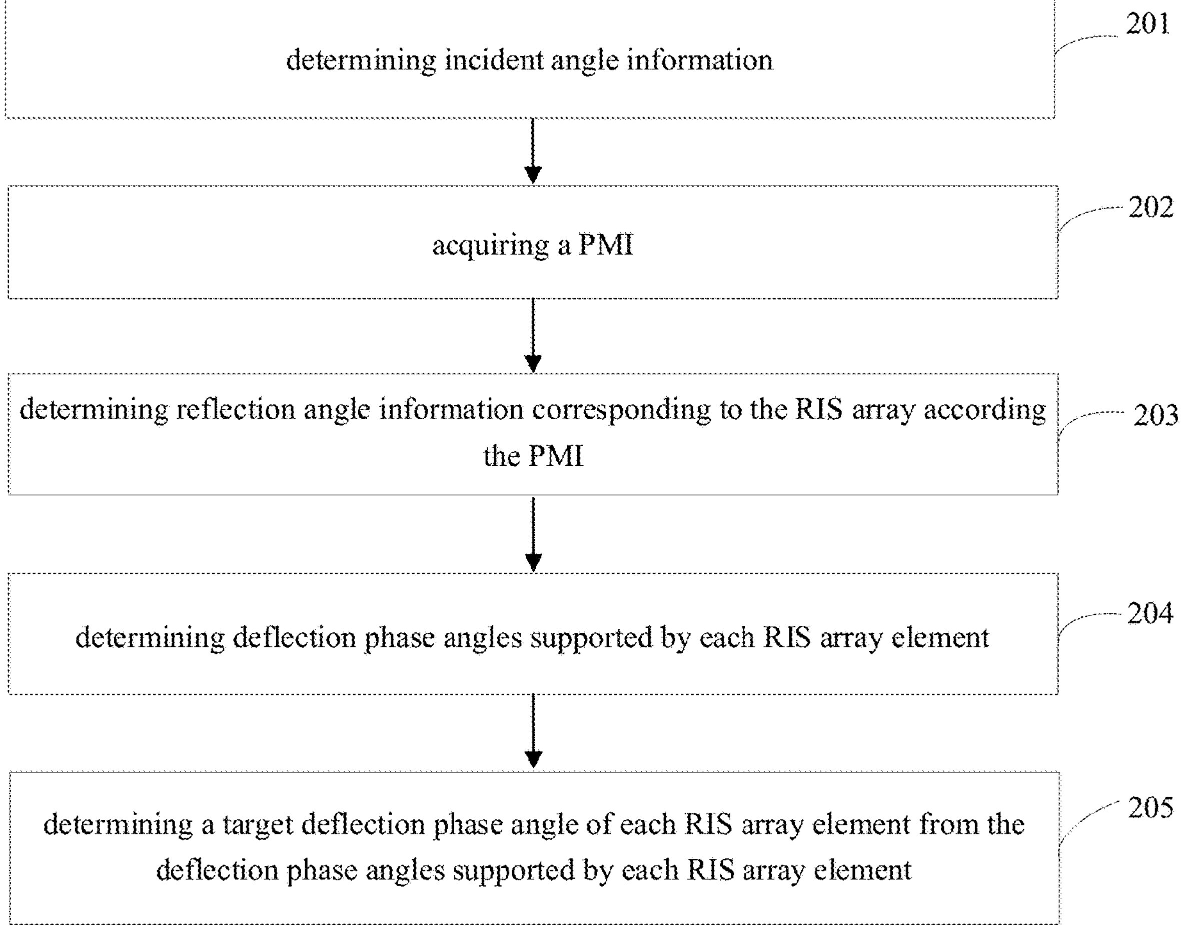
FIG. 2 is a flowchart illustrating a precoding method according to other embodiments of the disclosure.

FIG. 2 is a flowchart illustrating a precoding method according to other embodiments of the disclosure. The method is applicable to an RIS array. As illustrated in FIG. 2, the precoding method may include the following steps.

Step 201, incident angle information is determined.

Step 202, a PMI is acquired.

Step 203, reflection angle information corresponding to the RIS array is determined according to the PMI.

According to embodiments of the disclosure, for a detailed introduction of steps 201 to 203, reference may be made to the relevant introduction in the foregoing embodiments, and details are not repeated herein according to embodiments of the disclosure.

Step 204, deflection phase angles supported by each RIS array element are determined.

According to embodiments of the disclosure, each RIS array element may support at least one deflection phase angle. For example, according to embodiments of the disclosure, the deflection phase angles supported by a certain RIS array element may be: 0°, 45°, 90°, 120°.

Step 205, a target deflection phase angle of each RIS array element is determined from the deflection phase angles supported by each RIS array element.

According to embodiments of the disclosure, in detail, the target deflection phase angle of each RIS array element may be determined from the deflection phase angles supported by each RIS array element according to the incident angle information and the reflection angle information.

Moreover, according to embodiments of the disclosure, when determining the target deflection phase angle of each RIS array element in the RIS array, it is determined according to the expected reception power for the UE, and the UE may be the UE that transmits the PMI to the RIS array. According to embodiments of the disclosure, the expected reception power for the UE may include at least one of: the expected maximum reception power of the UE, the expected minimum reception power of the UE, or the expected scaling of the reception power of the UE. When the expected reception power for the UE is different, the manner for determining the target deflection phase angle of each RIS array element is also different. The manner for determining the target deflection phase angle may be described in detail in subsequent embodiments.

In conclusion, in the precoding method according to embodiments of the disclosure, the RIS array may determine the incident angle information of the incident beam, acquire the PMI where the PMI is determined according to the channel information between the RIS array and the UE, determine the reflection angle information corresponding to the RIS array according to the PMI, and determine the target deflection phase angle of each RIS array element in the RIS array according to the incident angle information and the reflection angle information, to precode the RIS array. It may be seen that according to embodiments of the disclosure, the RIS array may determine the reflection angle information according to the PMI and precode the RIS array according to the incident angle information and reflection angle information, such that the complexity is lower and the applicability is higher.

Figure 3:
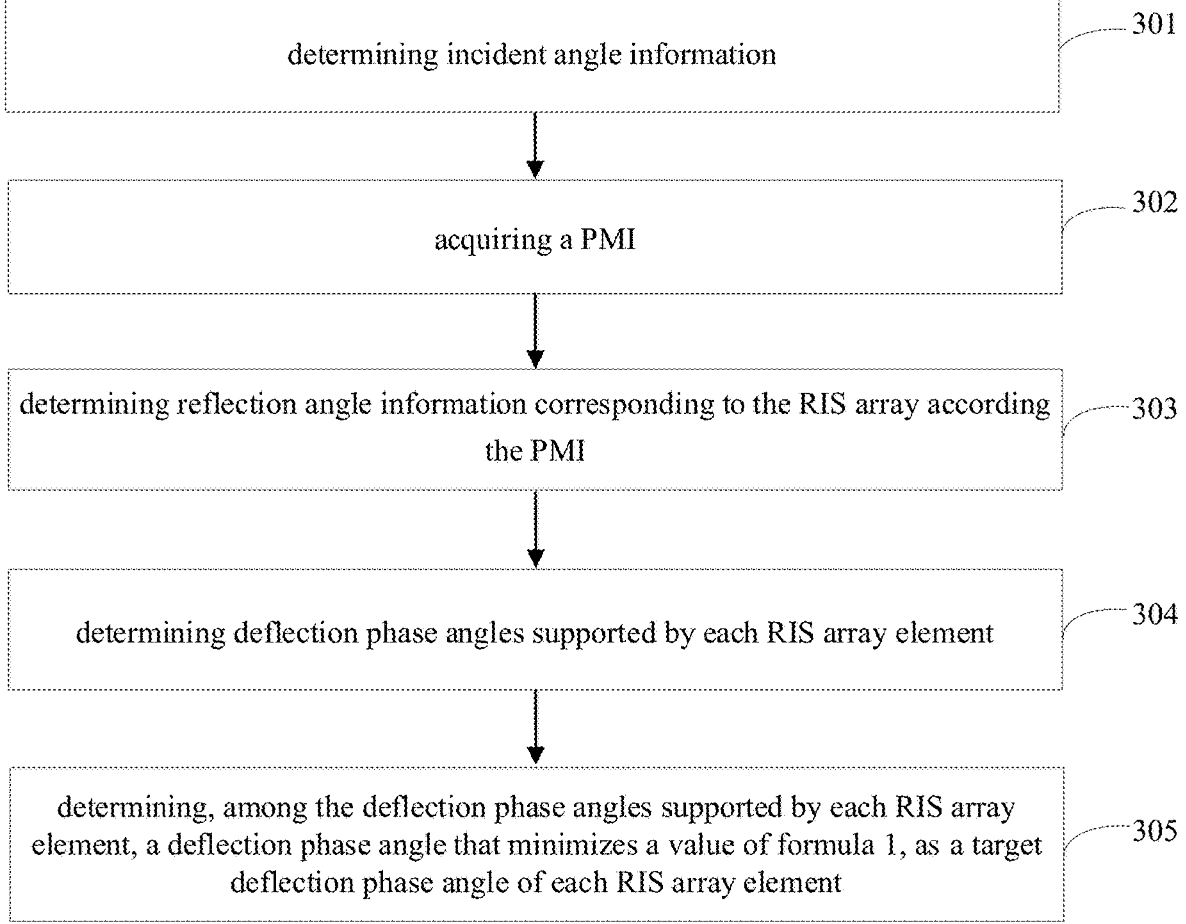
FIG. 3 is a flowchart illustrating a precoding method according to still other embodiments of the disclosure.

FIG. 3 is a flowchart illustrating a precoding method according to still other embodiments of the disclosure. The method is applicable to an RIS array. As illustrated in FIG. 3, the precoding method may include the following steps.

Step 301, incident angle information is determined.

Step 302, a PMI is acquired.

Step 303, reflection angle information corresponding to the RIS array is determined according the PMI.

Step 304, deflection phase angles supported by each RIS array element are determined.

According to embodiments of the disclosure, for a detailed introduction of steps 301 to 304, reference may be made to the relevant introduction in the foregoing embodiments, and details are not repeated herein according to embodiments of the disclosure.

Step 305, a deflection phase angle that minimizes a value of formula 1, among the deflection phase angles supported by each RIS array element, is determined as a target deflection phase angle of each RIS array element.

It should be noted that, according to embodiments of the disclosure, when it is expected that the reception power of the UE is maximized, the manner of embodiments is used to determine the target deflection phase angle of each RIS array element according to the above formula 1. According to embodiments of the disclosure, the above formula 1 includes:

$$\left|\omega_i - 2\pi \times \left(\frac{d \times (\cos(\alpha) + \cos(\beta))}{\lambda}\right) \times i\right|$$

where, $\omega_i$ is a deflection phase angle supported by an $i^{th}$ RIS array element, i=0, 1, . . . , N−1, N is a number of RIS array elements, d is a distance between RIS array elements, λ is a wavelength of the incident beam, α is the incident angle information, the incident angle information comprises the sum of the horizontal-dimension incident angle and the vertical-dimension incident angle of the incident beam, β is the reflection angle information, and the reflection angle information comprises the sum of the horizontal-dimension reflection angle and the vertical-dimension reflection angle corresponding to the RIS array, determined according to the PMI.

For example, according to embodiments of the disclosure, it is assumed that the deflection phase angles supported by a certain RIS array element may be: 0°, 45°, 90°, 120°. Substituting 0°, 45°, 90°, 120° into the above formula 1 respectively, the value after substituting 45° in formula 1>the value after substituting 90° in formula 1>the value after substituting 0° in formula 1>the value after substituting 120° in formula 1, 120° may be determined as the target deflection phase angle of the RIS array element at this time, and the target deflection phase angles corresponding to all RIS array elements may be determined by analogy.

In conclusion, in the precoding method according to embodiments of the disclosure, the RIS array may determine the incident angle information of the incident beam, acquire the PMI where the PMI is determined according to the channel information between the RIS array and the UE, determine the reflection angle information corresponding to the RIS array according to the PMI, and determine the target deflection phase angle of each RIS array element in the RIS array according to the incident angle information and the reflection angle information, to precode the RIS array. It may be seen that according to embodiments of the disclosure, the RIS array may determine the reflection angle information according to the PMI and precode the RIS array according to the incident angle information and reflection angle information, such that the complexity is lower and the applicability is higher.

Figure 4:
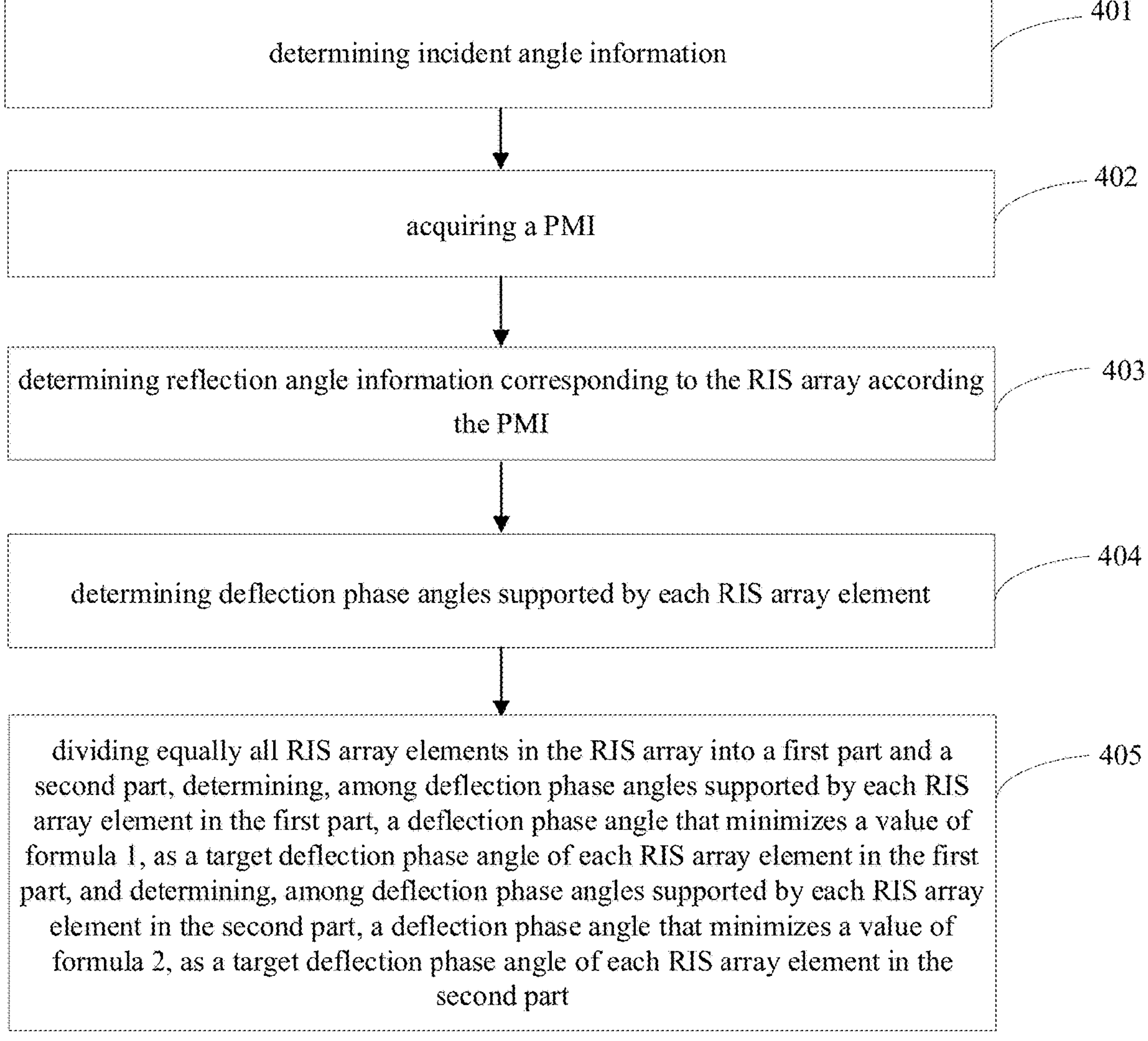
FIG. 4 is a flowchart illustrating a precoding method according to yet still other embodiments of the disclosure.

FIG. 4 is a flowchart illustrating a precoding method according to yet still other embodiments of the disclosure. The method is applicable to an RIS array. As illustrated in FIG. 4, the precoding method may include the following steps.

Step 401, incident angle information is determined.

Step 402, a PMI is acquired.

Step 403, reflection angle information corresponding to the RIS array is determined according the PMI.

Step 404, deflection phase angles supported by each RIS array element are determined.

According to embodiments of the disclosure, for a detailed introduction of steps 401 to 404, reference may be made to the relevant introduction in the foregoing embodiments, and details are not repeated herein according to embodiments of the disclosure.

Step 405, all RIS array elements in the RIS array are divided equally into a first part and a second part, a deflection phase angle that minimizes a value of formula 1, among deflection phase angles supported by each RIS array element in the first part, is determined as a target deflection phase angle of each RIS array element in the first part, and a deflection phase angle that minimizes a value of formula 2, among deflection phase angles supported by each RIS array element in the second part, is determined as a target deflection phase angle of each RIS array element in the second part.

It should be noted that, according to embodiments of the disclosure, when it is expected that the reception power of the UE is minimized (that is, the UE is regarded as the interfered user), the manner of the embodiments will be adopted according to the above formula 1 and formula 2 to determine the target deflection phase angle for each RIS array element. According to some embodiments of the disclosure, the above formula 1 includes:

$$\left|\omega_i - 2\pi \times \left(\frac{d \times (\cos(\alpha) + \cos(\beta))}{\lambda}\right) \times i\right|;$$

and the above formula 2 includes:

$$\left|\omega_i - 2\pi \times \left(\frac{d \times (\cos(\alpha) + \cos(\beta))}{\lambda}\right) \times i - \pi\right|,$$

where, $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises the sum of the horizontal-dimension incident angle and the vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

According to embodiments of the disclosure, the above-mentioned equal dividing manner may be random equal dividing.

For example, according to embodiments of the disclosure, it is assumed that the RIS array includes six RIS array elements, and after dividing equally, the first part and the second part each include three RIS array elements. It is assumed that deflection phase angles supported by a certain RIS array element in the first part are: 0°, 45°, 90°, 120°, and after substituting 0°, 45°, 90°, 120° into the above formula 1, the value after substituting 45° in formula 1>the value after substituting 90° in formula 1>the value after substituting 0° in formula 1>the value after substituting 120° in formula 1, and 120° may be determined as the target deflection angle of the RIS array element in the first part phase, and the target deflection phase angles of all RIS array elements in the first part are determined by analogy. It is assumed that deflection phase angles supported by a certain RIS array element in the second part are: 0°, 30°, 60°, 90°, and after substituting 0°, 30°, 60°, 90° into the above formula 1, the value after substituting 30° in formula 2>the value after substituting 90° in formula 2>the value after substituting 0° in formula 2>the value after substituting 60° in formula 2, and 60° may be determined as the target deflection phase angle of the RIS array element in the second part, and the target deflection phase angles of all RIS array elements in the second part are determined by analogy.

In conclusion, in the precoding method according to embodiments of the disclosure, the RIS array may determine the incident angle information of the incident beam, acquire the PMI where the PMI is determined according to the channel information between the RIS array and the UE, determine the reflection angle information corresponding to the RIS array according to the PMI, and determine the target deflection phase angle of each RIS array element in the RIS array according to the incident angle information and the reflection angle information, to precode the RIS array. It may be seen that according to embodiments of the disclosure, the RIS array may determine the reflection angle information according to the PMI and precode the RIS array according to the incident angle information and reflection angle information, such that the complexity is lower and the applicability is higher.

Figure 5:
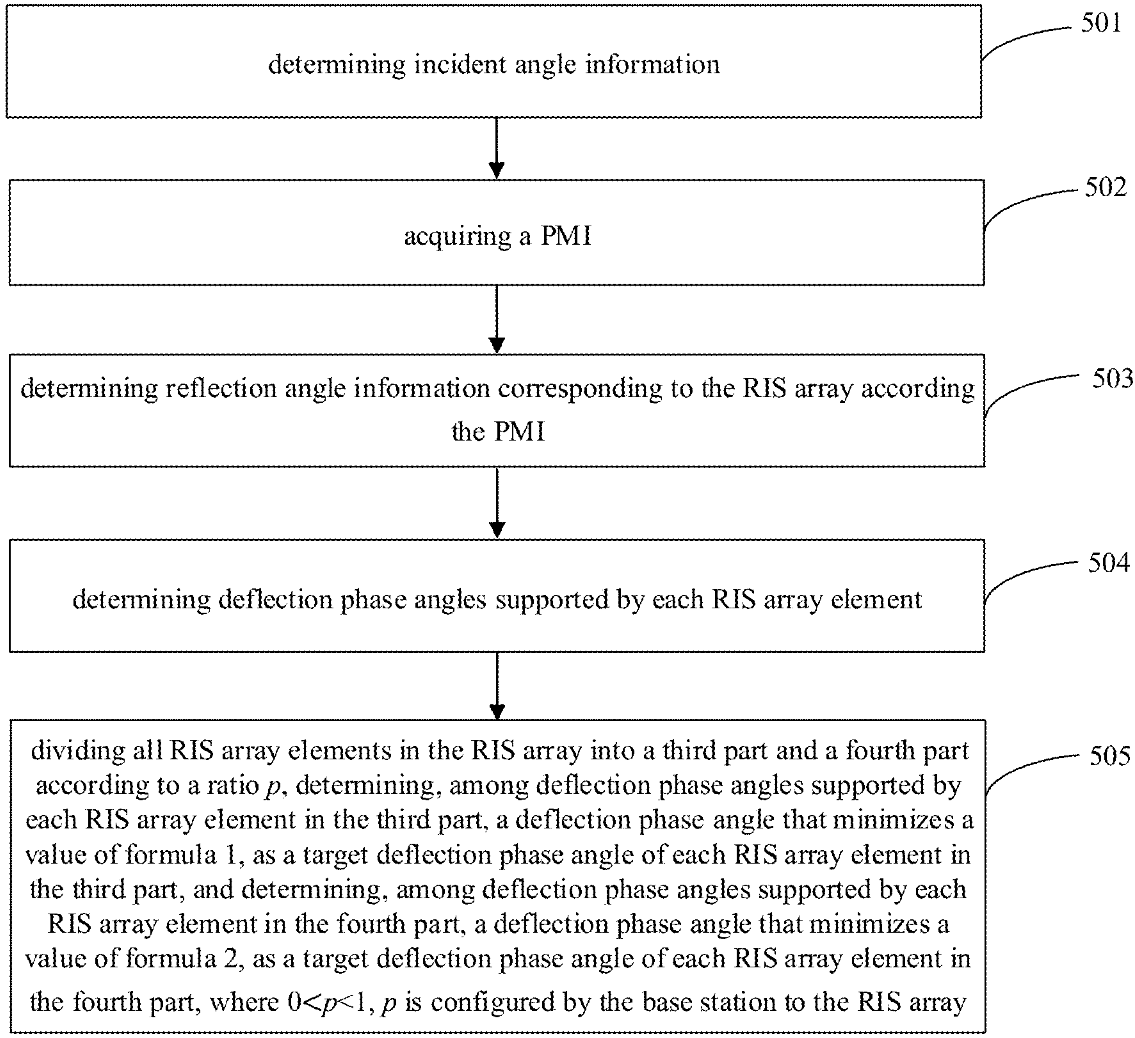
FIG. 5 is a flowchart illustrating a precoding method according to yet still other embodiments of the disclosure.

FIG. 5 is a flowchart illustrating a precoding method according to yet still other embodiments of the disclosure. The method is applicable to an RIS array. As illustrated in FIG. 5, the precoding method may include the following steps.

Step 501, incident angle information is determined.

Step 502, a PMI is acquired.

Step 503, reflection angle information corresponding to the RIS array is determined according the PMI.

Step 504, deflection phase angles supported by each RIS array element are determined.

According to embodiments of the disclosure, for a detailed introduction of steps 501 to 504, reference may be made to the relevant introduction in the foregoing embodiments, and details are not repeated herein according to embodiments of the disclosure.

Step 505, all RIS array elements in the RIS array are divided into a third part and a fourth part according to a ratio p, a deflection phase angle that minimizes a value of formula 1, among deflection phase angles supported by each RIS array element in the third part, is determined as a target deflection phase angle of each RIS array element in the third part, and a deflection phase angle that minimizes a value of formula 2, among deflection phase angles supported by each RIS array element in the fourth part, is determined as a target deflection phase angle of each RIS array element in the fourth part, where 0<p<1, p is configured by the base station to the RIS array.

It should be noted that, according to embodiments of the disclosure, when the reception power of the UE is expected to be scaled, the manner of the embodiments will be used to determine the target deflection phase angle of each RIS array element according to the ratio p and the above formulas 1 and 2.

According to embodiments of the disclosure, formula 1 includes:

$$\left|\omega_i - 2\pi \times \left(\frac{d \times (\cos(\alpha) + \cos(\beta))}{\lambda}\right) \times i\right|;$$

and formula 2 includes:

$$\left|\omega_i - 2\pi \times \left(\frac{d \times (\cos(\alpha) + \cos(\beta))}{\lambda}\right) \times i - \pi\right|;$$

where, $\omega_i$ is a deflection phase angle supported by an $i^{th}$ RIS array element, i=0, 1, . . . , N−1, N is a number of RIS array elements, d is a distance between RIS array elements, λ is a wavelength of the incident beam, α is the incident angle information, the incident angle information comprises the sum of the horizontal-dimension incident angle and the vertical-dimension incident angle of the incident beam, β is the reflection angle information, and the reflection angle information comprises the sum of the horizontal-dimension reflection angle and the vertical-dimension reflection angle corresponding to the RIS array, determined according to the PMI.

According to embodiments of the disclosure, 0<p<1, and p may be dynamically configured to the RIS array by the base station.

According to embodiments of the disclosure, the above-mentioned division of all RIS array elements in the RIS array into the third part and the fourth part according to the ratio p may be the randomly dividing. For example, according to embodiments of the disclosure, a product of a number of all RIS array elements in the RIS array and the ratio p may be determined as the first value, and the first value of RIS array elements are randomly selected among all RIS array elements and are identified as the third part, and the remaining RIS array elements are identified as the fourth part.

Further, according to embodiments of the disclosure, the scaling degree of the reception power of the UE is related to the value of p. When the reception power of the UE is expected to increase, the ratio p should satisfy: after dividing all RIS array elements according to the ratio p to acquire the third part and the fourth part, the more RIS array elements in the third part. When the reception power of the UE is expected to decrease, the ratio p should satisfy: after dividing all RIS array elements according to the ratio p to acquire the third part and the fourth part, the less RIS array elements in the third part.

In conclusion, in the precoding method according to embodiments of the disclosure, the RIS array may determine the incident angle information of the incident beam, acquire the PMI where the PMI is determined according to the channel information between the RIS array and the UE, determine the reflection angle information corresponding to the RIS array according to the PMI, and determine the target deflection phase angle of each RIS array element in the RIS array according to the incident angle information and the reflection angle information, to precode the RIS array. It may be seen that according to embodiments of the disclosure, the RIS array may determine the reflection angle information according to the PMI and precode the RIS array according to the incident angle information and reflection angle information, such that the complexity is lower and the applicability is higher.

FIG. 6 is a flowchart illustrating a precoding method according to other embodiments of the disclosure. The method is applicable to a base station. As illustrated in FIG. 6, the precoding method may include the following steps.

Step 601, a PMI transmitted by a UE is acquired.

According to embodiments of the disclosure, the PMI may be determined by the UE according to channel information between the RIS array and the UE.

Step 602, the PMI is forwarded to the RIS array.

In conclusion, in the precoding method according to embodiments of the disclosure, the base station may acquire the PMI transmitted by the UE, and forward the PMI to the RIS array. It may be seen that according to embodiments of the disclosure, the RIS array may determine the reflection angle information according to the acquired PMI, and precode the RIS array according to the incident angle information and reflection angle information, such that the complexity is lower and the applicability is higher.

FIG. 7 is a flowchart illustrating a precoding method according to other embodiments of the disclosure. The method is applicable to a base station. As illustrated in FIG. 7, the precoding method may include the following steps.

Step 701, a PMI transmitted by a UE is acquired.

Step 702, the PMI is forwarded to the RIS array.

According to embodiments of the disclosure, for a detailed introduction of steps 701 to 702, reference may be made to the relevant introduction in the foregoing embodiments, and details are not repeated herein according to the embodiments of the disclosure.

Step 703, a horizontal-dimension incident angle and a vertical-dimension incident angle of an incident beam transmitted by the base station to the RIS array, are transmitted to the RIS array, and/or a sum of the horizontal-dimension incident angle and the vertical-dimension incident angle of the incident beam transmitted by the base station, is transmitted to the RIS array.

According to embodiments of the disclosure, the base station may determine the horizontal-dimension incident angle and the vertical-dimension incident angle according to the incident beam transmitted to the RIS array.

According to embodiments of the disclosure, the horizontal-dimension incident angle includes an angle between the incident beam transmitted by the base station and the antenna array surface in the horizontal dimension. According to embodiments of the disclosure, the vertical-dimension incident angle includes an angle between the incident beam transmitted by the base station and the antenna array surface in the vertical dimension.

According to embodiments of the disclosure, the base station may transmit only the horizontal-dimension incident angle and the vertical-dimension incident angle of the incident beam to the RIS array. According to other embodiments of the disclosure, the base station may transmit directly the sum of the horizontal-dimension incident angle and the vertical-dimension incident angle of the incident beam to the RIS array. According to yet other embodiments of the disclosure, the base station may transmit the horizontal-dimension incident angle and the vertical-dimension incident angle of the incident beam, and the sum of the horizontal-dimensional incident angle and the vertical-dimensional incident angle, to the RIS array.

In conclusion, in the precoding method according to embodiments of the disclosure, the base station may acquire the PMI transmitted by the UE, and forward the PMI to the RIS array. It may be seen that according to embodiments of the disclosure, the RIS array may determine the reflection angle information according to the acquired PMI, and precode the RIS array according to the incident angle information and reflection angle information, such that the complexity is lower and the applicability is higher.

Figure 8:
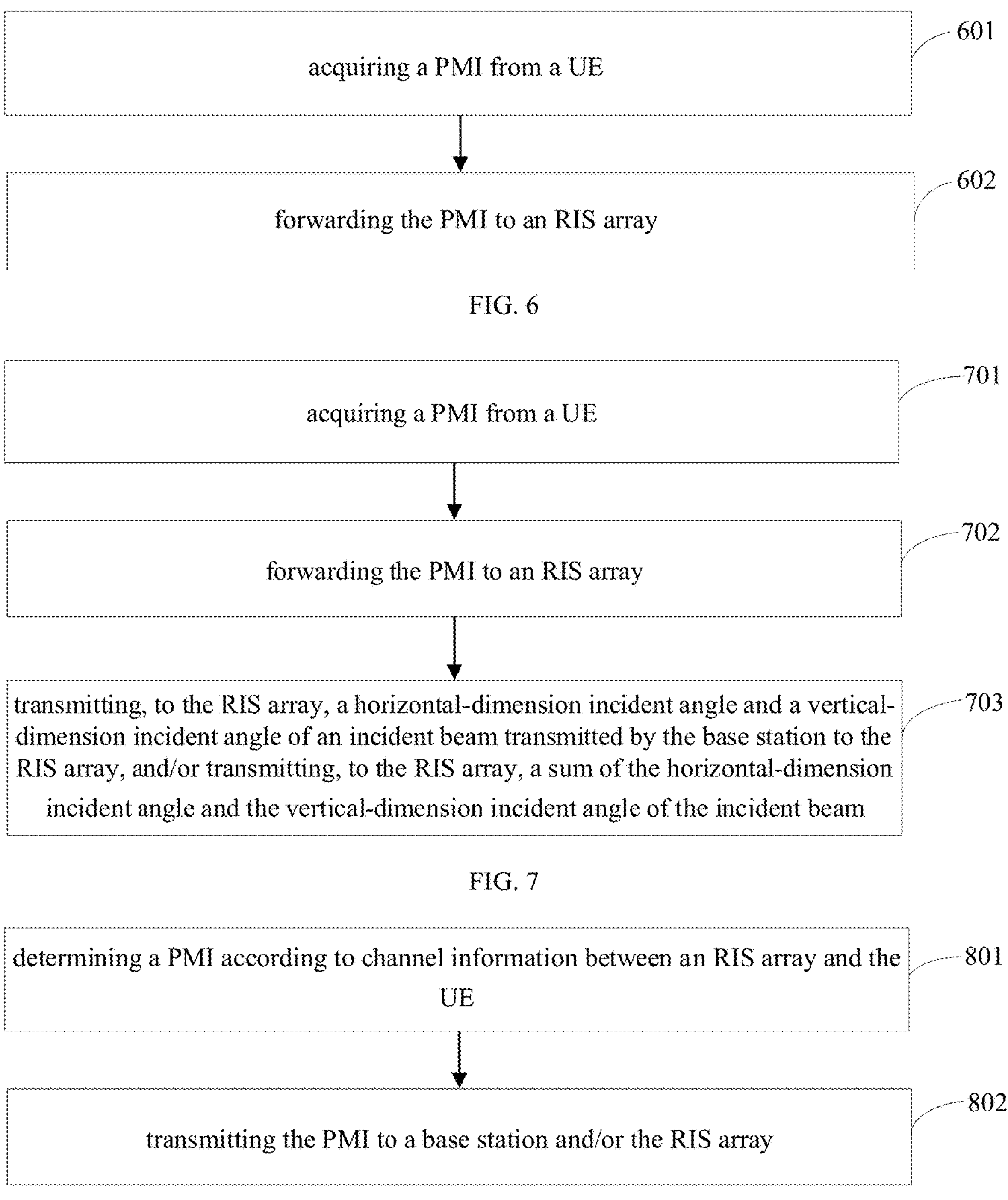
FIG. 8 is a flowchart illustrating a precoding method according to yet still other embodiments of the disclosure.

FIG. 8 is a flowchart of a precoding method according to other embodiments of the disclosure. The method is applicable to a UE. As illustrated in FIG. 8, the precoding method may include the following steps.

Step 801, a PMI is determined according to channel information between an RIS array and the UE.

According to embodiments of the disclosure, the UE may determine the most suitable precoding matrix for the channel according to the channel information between the RIS array and the UE, and determine the corresponding PMI according to the precoding matrix.

Step 802, the PMI is transmitted to the base station and/or the RIS array.

According to embodiments of the disclosure, the UE may transmit only the PMI to the base station, and the base station forwards the PMI to the RIS array, so that the RIS array may perform precoding on the RIS array according to the PMI.

According to other embodiments of the disclosure, the UE may transmit directly the PMI to the RIS array.

According to other embodiments of the disclosure, the UE may transmit the PMI to the base station and the UE at the same time.

In addition, it should be noted that, according to embodiments of the disclosure, the UE does not need to transmit the PMI to the base station and/or the UE, but directly determines the corresponding precoding matrix according to the PMI after determining the PMI, and determines the horizontal-dimension precoding vector and vertical-dimension precoding vector corresponding to the precoding matrix, and the determined horizontal-dimension precoding vector and vertical-dimension precoding vector are directly transmitted to the base station and/or RIS array, so that the RIS array may determine the corresponding horizontal-dimension reflection angle and vertical-dimension reflection angle of the RIS array according to the acquired horizontal-dimension precoding vector and vertical-dimension precoding vector, and determine the reflection angle information, and precode the RIS array according to the reflection angle information and incident angle information.

In conclusion, in the precoding method according to embodiments of the disclosure, the UE may determine the PMI according to the channel information between the RIS array and the UE, and transmit the PMI to the base station and/or the RIS array. It can be seen that according to embodiments of the disclosure, the RIS array may determine the reflection angle information according to the acquired PMI, and precode the RIS array according to the incident angle information and reflection angle information, so that the complexity is lower and the applicability higher.

Figure 9:
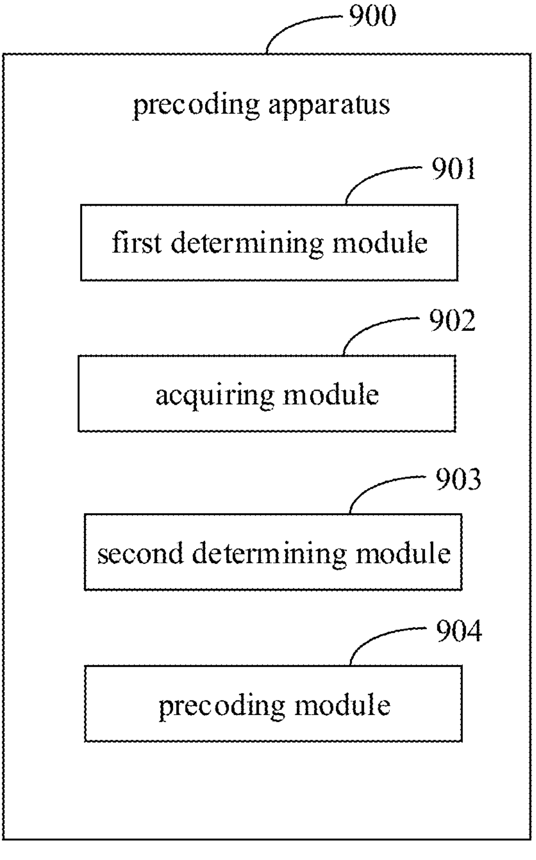
FIG. 9 is a block diagram illustrating a precoding apparatus according to some embodiments of the disclosure.

FIG. 9 is a block diagram illustrating a precoding apparatus according to some embodiments of the disclosure. As illustrated in FIG. 9, the apparatus 900 may include a first determining module 901, an acquiring module 1202, a second determining module 903, and a precoding module 1204.

The first determining module 901 is configured to determine incident angle information.

The incident angle information includes incident angle information of an incident beam transmitted by a base station to the RIS array.

The acquiring module 1202 is configured to acquire a PMI. The PMI is determined according to channel information between the RIS array and a UE.

The second determining module 903 is configured to determine reflection angle information corresponding to the RIS array according the PMI.

The precoding module 1204 is configured to determine a target deflection phase angle of each RIS array element in the RIS array according to the incident angle information and the reflection angle information, to precode the RIS array.

In conclusion, in the precoding apparatus according to embodiments of the disclosure, the RIS array may determine the incident angle information of the incident beam, acquire the PMI where the PMI is determined according to the channel information between the RIS array and the UE, determine the reflection angle information corresponding to the RIS array according to the PMI, and determine the target deflection phase angle of each RIS array element in the RIS array according to the incident angle information and the reflection angle information, to precode the RIS array. It may be seen that according to embodiments of the disclosure, the RIS array may determine the reflection angle information according to the PMI and precode the RIS array according to the incident angle information and reflection angle information, such that the complexity is lower and the applicability is higher.

According to embodiments of the disclosure, the first determining module 901 is also configured to: acquire a horizontal-dimension incident angle and a vertical-dimension incident angle of the incident beam transmitted by the base station, and/or acquire a sum of the horizontal-dimension incident angle and the vertical-dimension incident angle of the incident beam transmitted by the base station; and determine the sum of the horizontal-dimension incident angle and the vertical-dimension incident angle as the incident angle information.

Furthermore, according to other embodiments of the disclosure, the horizontal-dimension incident angle includes: an angle between the incident beam and an antenna array surface of the RIS array in a horizontal dimension, and the vertical-dimension incident angle includes: an angle between the incident beam and the antenna array surface of the RIS array in a vertical dimension.

Further, according to other embodiments of the disclosure, the manner for acquiring the PMI includes at least one of the following: acquiring the PMI transmitted by the UE; or acquiring the PMI forwarded by the base station.

Further, according to other embodiments of the disclosure, the above-mentioned second determining module 903 is also configured to: determine a precoding matrix corresponding to the PMI; determine a horizontal-dimension precoding vector and a vertical-dimension precoding vector corresponding to the precoding matrix; determine a horizontal-dimensional reflection angle and a vertical-dimensional reflection angle corresponding to the RIS array according to the horizontal-dimensional precoding vector and the vertical-dimensional precoding vector; and determine a sum of the horizontal-dimension reflection angle and the vertical-dimension reflection angle as the reflection angle information.

Further, according to other embodiments of the disclosure, the horizontal-dimension reflection angle includes: an angle between a reflection beam and an antenna array surface of the RIS array in a horizontal dimension, and the vertical-dimension reflection angle includes: an angle between the reflection beam and the antenna array surface of the RIS array in a vertical dimension.

Further, according to other embodiments of the disclosure, the precoding module 1204 is also configured to: determine deflection phase angles supported by each RIS array element; and determine the target deflection phase angle of each RIS array element from the deflection phase angles supported by each RIS array element.

Further, according to other embodiments of the disclosure, the precoding module 1204 is also configured to: determine, among the deflection phase angles supported by each RIS array element, a deflection phase angle that minimizes a value of formula 1, as the target deflection phase angle of each RIS array element. The formula 1 includes:

$$\left|\omega_i - 2\pi\left(\frac{d \times (\cos(\alpha) + \cos(\beta))}{\lambda}\right) \times i\right|;$$

where $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises the sum of the horizontal-dimension incident angle and the vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

Further, according to other embodiments of the disclosure, the precoding module 1204 is also configured to: divide equally all RIS array elements in the RIS array into a first part and a second part, determine, among deflection phase angles supported by each RIS array element in the first part, a deflection phase angle that minimizes a value of formula 1, as a target deflection phase angle of each RIS array element in the first part, and determine, among deflection phase angles supported by each RIS array element in the second part, a deflection phase angle that minimizes a value of formula 2, as a target deflection phase angle of each RIS array element in the second part. The formula 1 includes:

$$\left|\omega_i - 2\pi\left(\frac{d \times (\cos(\alpha) + \cos(\beta))}{\lambda}\right) \times i\right|;$$

and the formula 2 includes:

$$\left|\omega_i - 2\pi\left(\frac{d \times (\cos(\alpha) + \cos(\beta))}{\lambda}\right) \times i - \pi\right|;$$

where $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises the sum of the horizontal-dimension incident angle and the vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

Further, according to other embodiments of the disclosure, the precoding module 1204 is also configured to: divide all RIS array elements in the RIS array into a third part and a fourth part according to a ratio p, determine, among deflection phase angles supported by each RIS array element in the third part, a deflection phase angle that minimizes a value of formula 1, as a target deflection phase angle of each RIS array element in the third part, and determine, among deflection phase angles supported by each RIS array element in the fourth part, a deflection phase angle that minimizes a value of formula 2, as a target deflection phase angle of each RIS array element in the fourth part, where $0<p<1$, p is configured by the base station to the RIS array.

The formula 1 includes:

$$\left|\omega_i - 2\pi\left(\frac{d \times (\cos(\alpha) + \cos(\beta))}{\lambda}\right) \times i\right|;$$

and the formula 2 includes:

$$\left|\omega_i - 2\pi\left(\frac{d \times (\cos(\alpha) + \cos(\beta))}{\lambda}\right) \times i - \pi\right|;$$

where $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises the sum of the horizontal-dimension incident angle and the vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

Figure 10:
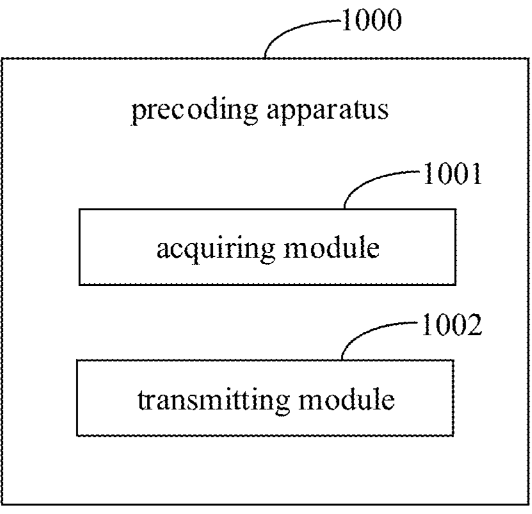
FIG. 10 is a block diagram illustrating a precoding apparatus according to other embodiments of the disclosure.

FIG. 10 is a block diagram illustrating a precoding apparatus according to other embodiments of the disclosure.

As illustrated in FIG. 10, the apparatus 1000 may include: an acquiring module 1001 and a transmitting module 1002.

The acquiring module 1001 is configured to acquire a PMI transmitted by a UE.

The transmitting module 1002 is configured to forward the PMI to an RIS array.

In conclusion, in the precoding apparatus according to embodiments of the disclosure, the base station may acquire the PMI transmitted by the UE, and forward the PMI to the RIS array. It may be seen that according to embodiments of the disclosure, the RIS array may determine the reflection angle information according to the acquired PMI, and precode the RIS array according to the incident angle information and reflection angle information, such that the complexity is lower and the applicability is higher.

According to embodiments of the disclosure, the above-mentioned apparatus is also configured to: transmit, to the RIS array, a horizontal-dimension incident angle and a vertical-dimension incident angle of an incident beam transmitted by the base station to the RIS array, and/or transmit, to the RIS array, a sum of the horizontal-dimension incident angle and the vertical-dimension incident angle of the incident beam.

Figure 11:
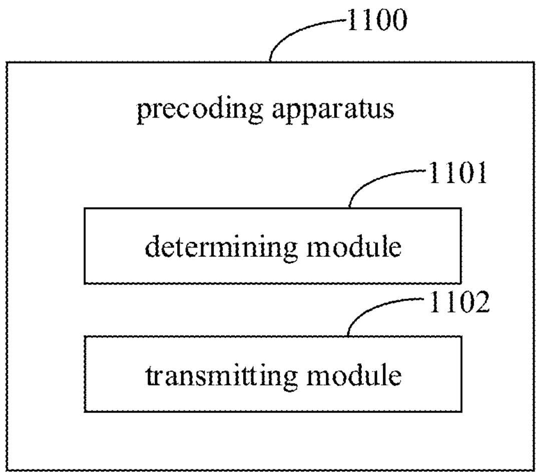
FIG. 11 is a block diagram illustrating a precoding apparatus according to still other embodiments of the disclosure.

FIG. 11 is a block diagram illustrating a precoding apparatus according to still other embodiments of the disclosure. As illustrated in FIG. 11, the apparatus 1100 may include: a determining module 1101 and a transmitting module 1102.

The determining module 1101 is configured to determine a PMI according to channel information between an RIS array and the UE.

The transmitting module 1102 is configured to transmit the PMI to a base station and/or the RIS array.

In conclusion, in the precoding apparatus according to embodiments of the disclosure, the UE may determine the PMI according to the channel information between the RIS array and the UE, and transmit the PMI to the base station and/or the RIS array. It can be seen that according to embodiments of the disclosure, the RIS array may determine the reflection angle information according to the acquired PMI, and precode the RIS array according to the incident angle information and reflection angle information, so that the complexity is lower and the applicability higher.

Figure 12:
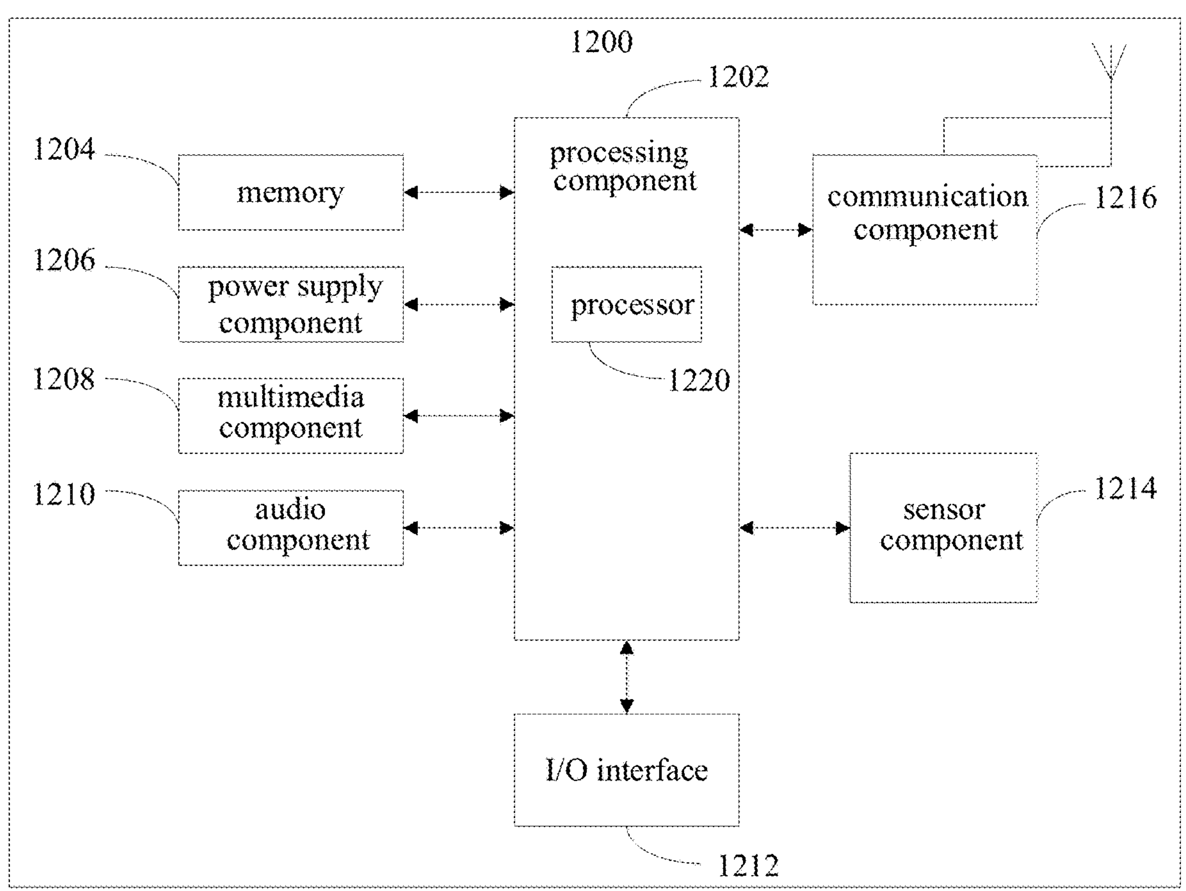
FIG. 12 is a block diagram illustrating a user equipment (UE) according to some embodiments of the disclosure.

FIG. 12 is a block diagram of a UE 1200 according to some embodiments of the disclosure. For example, the UE 1200 may be a mobile phone, a computer, a digital broadcasting terminal equipment, a messaging device, a game console, a tablet device, a medical equipment, a fitness equipment, a personal digital assistant, etc.

As illustrated in FIG. 12, the UE 1200 may include at least one component: a processing component 1202, a memory 1204, a power supply component 1206, a multimedia component 1208, an audio component 1210, an input/output (I/O) interface 1212, a sensor component 1213, and a communication component 1216.

The processing component 1202 generally controls the whole operation of the UE 1200, such as operations related to display, phone call, data communication, camera operation, and recording operation. The processing component 1202 may include one or more processors 1220 to perform instructions, to complete all or part of steps of the above methods. In addition, the processing component 1202 may include at least one module for the convenience of interaction between the processing component 1202 and other components. For example, the processing component 1202 may include a multimedia module for the convenience of interaction between the multimedia component 1208 and the processing component 1202.

The memory 1204 is configured to store all types of data to support an operation of the UE 1200. Examples of the data include the instructions of any applications or methods operated on the UE 1200, contact data, phone book data, messages, pictures, videos, etc. The memory 1204 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power supply component 1206 may provide power supply for all components of the UE 1200. The power supply component 1206 may include a power supply management system, at least one power supply, and other components related to generating, managing and distributing power for the UE 1200.

The multimedia component 1208 includes a screen of an output interface provided between the UE 1200 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 1208 includes a front camera and/or a rear camera. When the UE 1200 is in operation mode, such as shooting mode or video mode, the front camera or the rear camera may receive external multimedia data. Every front camera and rear camera may be a fixed optical lens system or an optical lens system with focal length and optical zoom capacity.

The audio component 1210 is configured as an output and/or input signal. For example, the audio component 1210 includes a microphone (MIC). When the UE 1200 is in operation mode, such as call mode, record mode, and speech recognition mode, a microphone is configured to receive external audio signals. The audio signals received may be further stored in the memory 1204 or sent via the communication units 1216. In some embodiments, the audio component 1210 further includes a speaker configured to output an audio signal.

The I/O interface 1212 provides an interface for the processing component 1202 and the peripheral interface module, and the peripheral interface module may be a keyboard, a click wheel, a button, etc. The buttons may include but not limited to a home button, a volume button, a start button and a lock button.

The sensor component 1213 includes at least one sensor configured to provide status assessments in all aspects for the UE 1200. For example, the sensor component 1213 may detect an on/off state of the UE 1200 and relative positioning of the component. For example, the component is a display and a keypad of the UE 1200. The sensor component 1213 may further detect a location change of the UE 1200 or one component of the UE 1200, presence or absence of contact between the user and the UE 1200, an orientation or acceleration/deceleration of the UE 1200, and a temperature change of the UE 1200. The sensor component 1213 may include a proximity sensor, which is configured to detect the existence of the objects nearby without any physical contact. The sensor component 1213 may further include a light sensor such as a CMOS or CCD image sensor, which is configured to use in imaging applications. In some embodiments, the sensor units 1213 may further include an acceleration transducer, a gyroscope sensor, a magnetic sensor, a pressure sensor or a temperature sensor.

The communication component 1216 may be configured for the convenience of wired or wireless communication between the UE 1200 and other devices. The UE 1200 may access wireless networks based on a communication standard, such as WiFi, 2G or 3G, or their combination. In an exemplary embodiment, the communication component 1216 receives broadcast signals or broadcast-related information from an external broadcast management system via a broadcast channel. In an exemplary embodiment, the communication units 1216 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In some embodiments, the UE 1200 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

Figure 13:
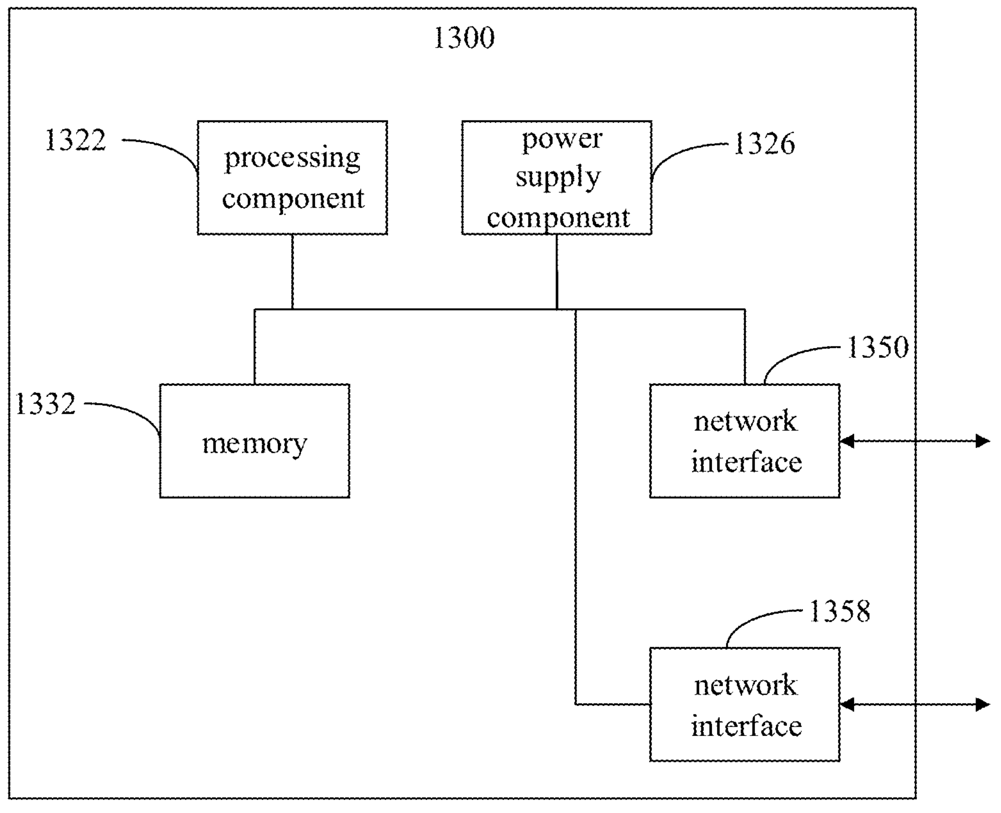
FIG. 13 is a block diagram illustrating a base station according to some embodiments of the disclosure.

FIG. 13 is a block diagram of a base station 1300 according to embodiments of the application. For example, the base station 1300 may be provided as a base station. Referring to FIG. 13, the base station 1300 includes a processing component 1311, which further includes at least one processor, and a memory resource represented by a memory 1332 for storing instructions executable by the processing component 1322, such as application programs. The application programs stored in the memory 1332 may include one or more modules each corresponding to a set of instructions. In addition, the processing component 1315 is configured to execute instructions, so as to execute any of the aforementioned methods applicable to the base station, for example, the method in FIG. 1.

The base station 1300 may also include a power supply component 1326 configured to perform power management of the base station 1300, a wired or wireless network interface 1350 configured to connect the base station 1300 to a network, and an I/O interface 1358. The base station 1300 may operate based on an operating system stored in the memory 1332, such as Windows Server™, Mac OS X™, Unix™, Linux™, Free BSD™, or the like.

According to embodiments of the disclosure, methods according to embodiments of the disclosure are introduced from the perspectives of the base station, UE, and RIS array. To achieve various functions in the methods according to embodiments of the disclosure, the base station and the UE each may include a hardware structure and a software module, to achieve the above functions in the form of the hardware structure, the software module, or the combination of the hardware structure and the software module. A certain function in the above functions may be performed by the hardware structure, the software module, or the combination of the hardware structure and the software module.

According to embodiments of the disclosure, methods according to embodiments of the disclosure are introduced from the perspectives of the base station, UE, and RIS array. To achieve various functions in the methods according to embodiments of the disclosure, the network side device and the UE each may include a hardware structure and a software module, to achieve the above functions in the form of the hardware structure, the software module, or the combination of the hardware structure and the software module. A certain function in the above functions may be performed by the hardware structure, the software module, or the combination of the hardware structure and the software module.

A communication device is provided according to embodiments of the disclosure. The communication device may include a transceiving module and a processing module. The transceiving module may include a transmitting module and/or a receiving module. The transmitting module is configured to implement a transmitting function, the receiving module is configured to implement a receiving function, and the transceiving module may implement a transmitting function and/or a receiving function.

The communication device may be a terminal device (for example, a terminal device in the above method embodiments), a device in the terminal device, or a device capable of being used with the terminal device. Alternatively, the communication may may be a network device, a device in the network device, or a device capable of being used with the network device.

Another communication device is provided according to embodiments of the disclosure. The communication device may be a network device, a terminal device (a terminal device in the above method embodiments), or a chip, a system on chip, or a processor that supports the network device to implement the methods, or a chip, a system on chip, or a processor that supports the terminal device to implement the methods. The device may be configured to implement the methods described in the method embodiments, and may refer to descriptions in the method embodiments.

The communication device may include one or more processors. The processor may include a general-purpose processor or a dedicated purpose processor. For example, the processor may be a baseband processor or a central processor. The baseband processor may be configured to process a communication protocol and communication data, and the central processor may be configured to control a communication device (e.g., a network side device, a baseband chip, a terminal device, a terminal device chip, a central unit (CU) or a distributed unit (DU), etc.), to execute a computer program, and process data of the computer program.

Alternatively or additionally, the communication device may further include one or more memories with a computer program stored thereon. The processor executes the computer program so that the communication device performs the methods as described in the above method embodiments. Alternatively or additionally, the memory may further store data. The communication device and the memory may be independently configured or integrated together.

Alternatively or additionally, the communication device may further include a transceiver and an antenna. The transceiver may be referred to as a transceiving unit, a transceiver, or a transceiving circuit, which may be configured to achieve a transceiving function. The transceiver may include a receiver and a transmitter. The receiver may be referred to as a receiver or a receiving circuit, etc., for implementing a receiving function; and the transmitter may be referred to as a transmitter or a transmission circuit, etc. for implementing a transmitting function.

Alternatively or additionally, the communication device may further include one or more interface circuits. The interface circuit is configured to receive code instructions and send the code instructions to the processor. The processor executes the code instructions so that the communication device performs the methods according to the above method embodiments.

The communication device is a terminal device (a terminal device in the above method embodiments): the processor is configured to execute the methods as illustrated in FIG. 8.

The communication device is a network device: the transceiver is configured to execute the method in any one of FIG. 6-FIG. 7.

The communication device is an RIS array: the transceiver is configured to execute the method shown in any one of FIG. 1-FIG. 5.

In one or more examples, the processor may include a transceiver for implementing receiving and transmitting functions. For example, the transceiver may be a transceiving circuit, or an interface, or an interface circuit. The transceiving circuit, or the interface, or the interface circuit for implementing receiving and transmitting functions may be separate or integrated. The above-mentioned transceiving circuit, interface, or interface circuit may be used for reading and writing code/data, or the above-mentioned transceiving circuit, interface, or interface circuit may be used for signal transmission/reception.

In one or more examples, the processor may may store a computer program. The computer program runs on the processor so that the communication device performs the methods as described in the above method embodiments. The computer program may be solidified in the processor, in which case the processor may be implemented by hardware.

In one or more examples, the communication device may include a circuit. The circuit may implement the functions of sending or receiving or communicating in the foregoing method embodiments. The processor and the transceiver described in the disclosure may be implemented in an integrated circuits (IC), an analog IC, a radio frequency integrated circuit (RFIC), a mixed-signal IC, an application specific integrated circuit (ASIC), a printed circuit board (PCB), electronic equipment, or the like. The processor and the transceiver may also be fabricated using various IC process technologies, such as complementary metal oxide semiconductor (CMOS), nMetal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above embodiments may be a network device or a terminal device (for example, a terminal device in the above method embodiments), but the scope of the communication device described in the disclosure is not limited thereto, and a structure of the communication device may not be subject to FIG. 11. The communication device may be a stand-alone device or may be a part of a larger device. For example, the communication device may be:

(1) a stand-alone IC, or a chip, or a chip system, or a chip subsystem;

(2) a set of one or more ICs, alternatively or additionally, the set may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handset, a mobile unit, an in-vehicle device, a network device, a cloud device, an artificial intelligence device, etc.;

(6) others.

In the case that the communication device may be a chip or a system on chip, the chip includes a processor and a chip. There may be one or more processors, and there may be a plurality of interfaces.

Alternatively or additionally, the chip further includes a memory. The memory is configured to save a necessary computer program and data.

Those skilled in the art may also understand that various illustrative logical blocks and steps listed in the embodiments of the disclosure may be implemented in electronic hardware, computer software, or a combination thereof. Whether such function is implemented in hardware or software depends on specific applications and overall system design requirements. Those skilled in the art may use various manners to implement functions for each specific application, but such implementation should not be understood as exceeding the protection scope of the embodiments of the disclosure.

A system for determining a sidelink duration is further provided according to embodiments of the disclosure. The system includes a communication device (for example, a first terminal device in the above method embodiments) serving as a terminal device in embodiments and a communication device serving as a network device in embodiments, or the system includes a communication device serving as a terminal device (for example, a first terminal device in the above method embodiments) and a communication device serving as a network device in embodiments.

A non-transitory computer-readable storage medium with instructions stored thereon is further provided in the disclosure. When the instructions are executed by a computer, steps in the any one method embodiment are implemented.

A computer program product is further provided. The computer program product implements functions of the above any one method embodiment when executed by a processor.

According to the above embodiments, it may be implemented in whole or in part by software, hardware, firmware, or any combination thereof. When it is implemented in software, it may be implemented in whole or in part in a form of computer program product. The computer program product includes one or more computer programs. When the computer programs are loaded and executed on the computer, flows or functions according to the embodiments of the disclosure may be generated in whole or in part. The computer may be a general purpose computer, a special purpose computer, a computer network, or other programmable device. The computer programs may be stored on a computer-readable non-transitory storage medium or transferred from one computer-readable non-transitory storage medium to another computer-readable non-transitory storage medium, for example, the computer programs may be transferred from a website site, a computer, a server, or a data center over a wire (e.g. coaxial cable, optical fiber, digital subscriber line (DSL)) or wireless (e.g. infrared, wireless, microwave) means to another website site, another computer, another server, or another data center. The computer-readable non-transitory storage medium may be any available medium that may be accessed by a computer or a data storage device such as a server, a data center, or the like that includes an integration of one or more available media. The available medium may be a magnetic medium (e.g., floppy disk, hard disk, magnetic tape), an optical medium (e.g., high-density digital video disc (DVD)), a semiconductor medium (e.g., solid state disk (SSD)), or the like.

Those skilled in the art may understand that the first, second, and other numeral numbers involved in the disclosure are only for the convenience of description, and are not used to limit the scope of the embodiments of the disclosure, which also represent a sequence.

At least one in this disclosure may also be described as one or more, which is not limited in this disclosure. A plurality of or multiple in this disclosure may be two, three, four, or more, which is not limited in this disclosure. In the embodiments of the disclosure, for a type of technical features, the technical features are distinguished by "first," "second," "third," "A," "B," "C," and "D," etc. There is no order or order of magnitude for the technical features described in "first," "second," "third," "A," "B," "C," and "D", etc.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of embodiments in the disclosure are given by the appended claims.

It should be understood that the disclosure is not limited to the precise structure described above and shown in the drawings, and various modifications and changes may be made without departing from its scope. The scope of the present application is only limited by the appended claims. The scope of the disclosure is only limited by the appended claims.

What is claimed is:

1. A precoding method, performed by a reconfigurable intelligent surface (RIS) array, the method comprising:

determining incident angle information, the incident angle information comprising incident angle information of an incident beam transmitted by a base station to the RIS array;

acquiring a precoding matrix index (PMI), the PMI being determined according to channel information between the RIS array and a user equipment (UE);

determining reflection angle information corresponding to the RIS array according to the PMI; and determining a target deflection phase angle of each RIS array element in the RIS array according to the incident angle information and the reflection angle information, to precode the RIS array;

wherein determining the target deflection phase angle of each RIS array element in the RIS array according to the incident angle information and the reflection angle information comprises:

determining deflection phase angles supported by each RIS array element; and determining the target deflection phase angle of each RIS array element from the deflection phase angles supported by each RIS array element;

wherein determining the target deflection phase angle of each RIS array element from the deflection phase angles supported by each RIS array element comprises:

determining, among the deflection phase angles supported by each RIS array element, a deflection phase angle that minimizes a value of formula 1, as the target deflection phase angle of each RIS array element;

wherein, the formula 1 comprises:

$$\left|\omega_i - 2\pi\left(\frac{d\times(\cos(\alpha)+\cos(\beta))}{\lambda}\right)\times i\right|;$$

and wherein $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises a sum of a horizontal-dimension incident angle and a vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

2. The method according to claim 1, wherein determining the incident angle information comprises:

acquiring a horizontal-dimension incident angle and a vertical-dimension incident angle of the incident beam transmitted by the base station, and/or acquiring a sum of the horizontal-dimension incident angle and the vertical-dimension incident angle of the incident beam transmitted by the base station; and determining the sum of the horizontal-dimension incident angle and the vertical-dimension incident angle as the incident angle information.

3. The method according to claim 2, wherein the horizontal-dimension incident angle comprises: an angle between the incident beam and an antenna array surface of the RIS array in a horizontal dimension, and the vertical-dimension incident angle comprises: an angle between the incident beam and the antenna array surface of the RIS array in a vertical dimension.

4. The method according to claim 1, wherein acquiring the PMI comprises at least one of following acts:

acquiring the PMI transmitted by the UE; or acquiring the PMI forwarded by the base station.

5. The method according to claim 1, wherein determining the reflection angle information corresponding to the RIS array according to the PMI comprises:

determining a precoding matrix corresponding to the PMI;

determining a horizontal-dimension precoding vector and a vertical-dimension precoding vector corresponding to the precoding matrix;

determining a horizontal-dimensional reflection angle and a vertical-dimensional reflection angle corresponding to the RIS array according to the horizontal-dimensional precoding vector and the vertical-dimensional precoding vector; and determining a sum of the horizontal-dimension reflection angle and the vertical-dimension reflection angle as the reflection angle information.

6. The method according to claim 5, wherein the horizontal-dimension reflection angle comprises: an angle between a reflection beam and an antenna array surface of the RIS array in a horizontal dimension, and the vertical-dimension reflection angle comprises: an angle between the reflection beam and the antenna array surface of the RIS array in a vertical dimension.

7. A precoding method, performed by a communication system comprising a base station, a reconfigurable intelligent surface (RIS) array and a user equipment (UE), the method comprising:

determining, by the UE, a precoding matrix index (PMI) according to channel information between the RIS array and the UE; and transmitting, by the UE, the PMI to the base station and/or the RIS array;

the method further comprises:

acquiring, by the base station, the PMI from the UE; and forwarding, by the base station, the PMI to the RIS array; and the method further comprises:

determining, by the RIS array, incident angle information, the incident angle information comprising incident angle information of an incident beam transmitted by the base station to the RIS array;

acquiring, by the RIS array, the PMI, the PMI being determined according to channel information between the RIS array and the UE;

determining reflection angle information corresponding to the RIS array according to the PMI; and determining a target deflection phase angle of each RIS array element in the RIS array according to the incident angle information and the reflection angle information, to precode the RIS array;

wherein determining the target deflection phase angle of each RIS array element in the RIS array according to the incident angle information and the reflection angle information comprises:

determining deflection phase angles supported by each RIS array element; and determining the target deflection phase angle of each RIS array element from the deflection phase angles supported by each RIS array element;

wherein determining the target deflection phase angle of each RIS array element from the deflection phase angles supported by each RIS array element comprises:

determining, among the deflection phase angles supported by each RIS array element, a deflection phase angle that minimizes a value of formula 1, as the target deflection phase angle of each RIS array element;

wherein, the formula 1 comprises:

$$\left|\omega_i - 2\pi\left(\frac{d\times(\cos(\alpha)+\cos(\beta))}{\lambda}\right)\times i\right|;$$

and wherein $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises a sum of a horizontal-dimension incident angle and a vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

8. The method according to claim 7, further comprising: transmitting, to the RIS array, a horizontal-dimension incident angle and a vertical-dimension incident angle of an incident beam transmitted by the base station to the RIS array, and/or transmitting, to the RIS array, a sum of the horizontal-dimension incident angle and the vertical-dimension incident angle of the incident beam.

9. A communication device, comprising a processor and a memory storing a computer program, wherein the processor executes the computer program stored in the memory, to cause the communication device to perform the method according to claim 7.

10. A non-transitory computer-readable storage medium storing instructions, wherein when the instructions are executed, the method according to claim 1 is implemented.

11. A non-transitory computer-readable storage medium storing instructions, wherein when the instructions are executed, the method according to claim 7 is implemented.

12. A communication device, comprising a processor and a memory storing a computer program, wherein the processor executes the computer program stored in the memory, to cause the communication device to perform:

determining incident angle information, the incident angle information comprising incident angle information of an incident beam transmitted by a base station to the RIS array;

acquiring a precoding matrix index (PMI), the PMI being determined according to channel information between the RIS array and a user equipment (UE);

determining reflection angle information corresponding to the RIS array according to the PMI; and determining a target deflection phase angle of each RIS array element in the RIS array according to the incident angle information and the reflection angle information, to precode the RIS array;

wherein determining the target deflection phase angle of each RIS array element in the RIS array according to the incident angle information and the reflection angle information comprises:

determining deflection phase angles supported by each RIS array element; and determining the target deflection phase angle of each RIS array element from the deflection phase angles supported by each RIS array element;

wherein determining the target deflection phase angle of each RIS array element from the deflection phase angles supported by each RIS array element comprises:

determining, among the deflection phase angles supported by each RIS array element, a deflection phase angle that minimizes a value of formula 1, as the target deflection phase angle of each RIS array element;

wherein, the formula 1 comprises:

$$\left|\omega_i - 2\pi\left(\frac{d\times(\cos(\alpha)+\cos(\beta))}{\lambda}\right)\times i\right|;$$

and wherein $\omega_i$ is a deflection phase angle supported by an $i^{th}$ RIS array element, i=0, 1, . . . , N−1, N is a number of RIS array elements, d is a distance between RIS array elements, $\lambda$ is a wavelength of the incident beam, $\alpha$ is the incident angle information, the incident angle information comprises a sum of a horizontal-dimension incident angle and a vertical-dimension incident angle of the incident beam, $\beta$ is the reflection angle information, and the reflection angle information comprises the sum of the horizontal-dimension reflection angle and the vertical-dimension reflection angle corresponding to the RIS array, determined according to the PMI.

* * * * *